US007676006B2

(12) United States Patent
Valle

(10) Patent No.: US 7,676,006 B2
(45) Date of Patent: Mar. 9, 2010

(54) METHOD AND SYSTEM FOR ESTIMATING THE DOPPLER SPREAD IN RADIO MOBILE TELECOMMUNICATION SYSTEMS AND COMPUTER PROGRAM PRODUCT THEREFOR

(75) Inventor: Stefano Valle, Milan (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 1590 days.

(21) Appl. No.: 10/930,733

(22) Filed: Aug. 31, 2004

(65) Prior Publication Data

US 2005/0089124 A1    Apr. 28, 2005

(30) Foreign Application Priority Data

Sep. 5, 2003    (EP)    ................... 03425574

(51) Int. Cl.
*H03D 1/04* (2006.01)
(52) U.S. Cl. ...................................... 375/346
(58) Field of Classification Search ................ 375/140, 375/141, 147, 340, 344, 346
See application file for complete search history.

(56) References Cited

U.S. PATENT DOCUMENTS

| | | | | |
|---|---|---|---|---|
| 5,157,727 A | * | 10/1992 | Schloss | 704/213 |
| 5,513,221 A | | 4/1996 | Parr et al. | |
| 6,160,841 A | * | 12/2000 | Stansell et al. | 375/148 |
| 6,377,813 B1 | | 4/2002 | Kansakoski et al. | 455/522 |
| 6,658,045 B1 | * | 12/2003 | Jin | 375/147 |

(Continued)

FOREIGN PATENT DOCUMENTS

| WO | WO 01/99303 | 12/2001 |
|---|---|---|
| WO | 02/063814 A2 | 8/2002 |

OTHER PUBLICATIONS

3GPP TS 25.211 V3.6.0, Technical Specification, "3rd Generation Partnership Project; Technical Specification Group Radio Access Network; Physical Channels and Mapping of Transport Channels onto Physical Channels (FDD), (Release 1999)," Mar. 2001, 45 pp.

(Continued)

*Primary Examiner*—David C Payne
*Assistant Examiner*—Leon-Viet Q Nguyen
(74) *Attorney, Agent, or Firm*—Lisa K. Jorgenson; Robert Iannucci; Seed IP Law Group PLLC

(57) ABSTRACT

The Doppler spread associated to a transmission channel with a gain represented by a random process, is estimated by transmitting on the channel a digital signal ($DPCCH_{I,Q}$), which comprises at least one pilot signal, which in turn comprises fields of known symbols, and estimating, on the basis of the pilot signal ($DPCCH_{I,Q}$), the channel so as to generate a signal indicating the aforesaid gain. There is then detected the zero-crossing rate ($\eta$) of the aforesaid signal during a given time interval, and there is also estimated the signal-to-noise ratio (SNR) associated to the channel. The bandwidth ($\hat{f}_D$) of the aforesaid random process is estimated according to a reference quantity ($I_D^{(2)}$), which comprises: a first term ($\hat{\eta}^2 \pi^2$), representing an estimate ($\hat{\eta}$) of said zero-crossing rate ($\eta$); and a second term $$\left( \frac{I_N^{(2)} - \hat{\eta}^2 \pi^2 I_N^{(0)}}{2SNR} \right),$$

which includes said signal-to-noise ratio of the channel.

47 Claims, 5 Drawing Sheets

U.S. PATENT DOCUMENTS

| | | | |
|---|---|---|---|
| 6,862,457 B1 * | 3/2005 | Sarkar et al. | 455/522 |
| 2002/0167913 A1 | 11/2002 | Leung | |
| 2002/0172307 A1 * | 11/2002 | Sandberg | 375/344 |
| 2004/0240586 A1 * | 12/2004 | Li et al. | 375/329 |

OTHER PUBLICATIONS

Andoh, H., et al., "Channel Estimation Filter Using Time-Multiplexed Pilot Channel for Coherent RAKE Combining in DS-CDMA Mobile Radio," IEICE Trans. Commun. vol. E81-B, No. 7, Jul. 1998, pp. 1517-1526.

Austin, M., et al., "Eigen-Based Doppler Estimation for Differentially Coherent CPM," IEEE Transactions on Vehicular Technology, vol. 43, No. 3, Aug. 1994, pp. 781-785.

Austin, M., et al., "Velocity Adaptive Handoff Algorithms for Microcellular Systems," IEEE Transactions on Vehicular Technology, vol. 43, No. 3, Aug. 1994, pp. 549-561.

Holtzman, J., et al., "Adaptive Averaging Methodology for Handoffs in Cellular Systems," IEEE Transactions on Vehicular Technology, vol. 44, No. 1, Feb. 1995, pp. 59-66.

Kirsch, M., et al., "Mobile Speed Estimation for 3G Mobile Radio Systems Using the Normalized Autocovariance Function," IEEE, 2002, pp. 48-1 through 48-4.

Narasimhan, R., et al., "Speed Estimation in Wireless Systems Using Wavelets," IEEE, 1999, pp. 1773-1778.

Xiao, C., et al., "Mobile Speed Estimation for TDMA-Based Hierarchical Cellular Systems," IEEE Transactions on Vehicular Technology, vol. 50, No. 4, Jul. 2001, pp. 981-991.

* cited by examiner

METHOD AND SYSTEM FOR ESTIMATING THE DOPPLER SPREAD IN RADIO MOBILE TELECOMMUNICATION SYSTEMS AND COMPUTER PROGRAM PRODUCT THEREFOR

BACKGROUND OF THE INVENTION

1. Field of the Invention

The present disclosure generally relates to techniques that enable estimation of the so-called Doppler spread in mobile radio telecommunication systems and has been developed with particular but not exclusive attention paid to a possible application thereof to channel estimation in digital telecommunication systems exposed to fading phenomena. Reference to this specific field of application is not in any case to be understood as in any way limiting the scope of the invention, which is altogether general.

2. Description of the Related Art

Transmission systems, such as digital-transmission systems, operate with non-ideal transmission channels.

For example, in mobile radio systems the transmission channel has characteristics that vary according to the relative speed of the transmitter and the receiver. Consequently, there is a Doppler shift of the signals that propagate along the transmission channel according to the line of sight and, in the case of multiple paths, a phenomenon of Doppler spread. The latter phenomenon, in practically, takes the form of a smearing of the signal bandwidth along the frequency axis which is proportional to the speed. The situation is rendered even more critical by the fact that the fading phenomena have a selective behavior in frequency. However, there exists the possibility, using advanced modulation and demodulation techniques, of equating this phenomenon to the sum of fading phenomena that have a uniform behavior in frequency.

Techniques that achieve this result are, for example, spread-spectrum techniques in particular in conjunction with the receivers commonly referred to as "rake" receivers; this is, for example, the case of transmission systems that use the so-called code-division multiple access (CDMA) technique, which is adopted in third-generation mobile-phone systems, or else orthogonal frequency-division multiplexing (OFDM) techniques.

The impulse response of a channel affected by flat-type fading (i.e., non-selective in frequency) may be expressed in the form of a complex gain that can be modeled as a random process with a certain bandwidth, referred to as Doppler spread, which is proportional to the relative speed of the transmitter and the receiver. The shape of the power spectral density of the process depends upon the scattering environment and can be modeled according to different criteria, well known to persons skilled in the art.

Techniques aimed at compensating the non-ideal character of the channel can be basically reduced to two fundamental categories.

In the first place, there exist non-coherent detection techniques which, in order to avoid having to estimate the channel, resort to a modulation of a differential type.

There then exist coherent detection techniques, which compensate for channel distortion after having estimated the transfer function (or the impulse response) of the channel itself.

For this purpose, a technique commonly used for performing channel estimation is that of transmitting symbols known to the receiver, called pilot symbols. These signals are transmitted in a continuous way or, at least, with a rate sufficient to be able to follow the variations of the channel in all the operating conditions. Usually, the channel transfer function varies according to the relative speed of the transmitter and the receiver, and the characteristics of the pilot signals are defined in such a way as to be able to face up to the maximum expected speed.

Again, the use of pilot symbols can be adapted to the instantaneous operating conditions: for example, the number of pilot symbols to be used for instantaneous channel estimation can be chosen according to the effective speed. In effect, whenever the speed is less than the maximum expected speed, the pilot symbols may be redundant and can thus be exploited for increasing the reliability of channel estimation. For this reason, to test channel estimation it is advantageous to provide an estimation of the speed (or an estimation of Doppler spread—which is equivalent).

There exist different methods of channel estimation of an adaptive type driven by the statistics of the channel. For example, without thereby wishing in any way to exhaust the entire range of the literature on the subject, which is extremely vast, reference may be made to the work of H. Andoh et al.: "Channel Estimation Filter Using Time Multiplexed Pilot Channel for Coherent RAKE Combining in DS-CDMA Mobile Radio", IEICE TRANS. COMMUN., vol. E81-B, n.7, July 1998, pp. 1517-1526, or to the patent documents US2002 167913, WO-A-02/063814, or U.S. Pat. No. 5,513,221.

In actual fact, knowledge of the Doppler spread provides useful information on the speed of a mobile terminal so that the corresponding information is useful not just for the purposes of the channel estimation but also for other operations such as, for example:

hand-off procedures, in so far as the measurements performed for enabling hand-off are more reliable if they take into account the speed of the mobile terminal, in particular adapting the measurement time window according to the speed of the mobile terminal, as illustrated for example in the work of M. D. Austin et al.: "Velocity Adaptive Hand-off Algorithms for Microcellular Systems", IEEE TRANSACTIONS ON VEHICULAR TECHNOLOGY, vol. 43, n. 3, August 1994, pp. 549-561; and cell assignment in hierarchical cellular systems, which requires the knowledge of the speed of the mobile terminal to determine whether to assign the user to cells of a micro or macro type, as described in the work of C. Xiao et al.: "Mobile Speed Estimation for TDMA-Based Hierarchical Cellular Systems", IEEE TRANSACTIONS ON VEHICULAR TECHNOLOGY, vol. 50, n. 4, July 2001, pp. 981-991.

Yet again as regards estimation of Doppler spread (which is the main statistical property for driving the channel-estimation function) a large number of different techniques have already been proposed, which envisage for example:

measurement of the crossing rate of a certain level (level-crossing rate or LCR), with the particular case of zero-crossing rate (ZCR)—treated in the article by Austin et al., already cited previously;

use of the autocovariance (see, for example, the work of M. Kirsch et al.: "Mobile Speed Estimation for 3G Mobile Radio Systems using the Normalized Autocovariance Function"—2002 International Zurich Seminar on the Broadband Communications Success—Transmission Networking, February 19-31, ETH Zurich, Switzerland (pp. 48-1-48-4);

recourse to the eigenspace method, documented in the work of M. D. Austin et al.,: "Eigen-Based Doppler Estimation for Differentially Coherent CPM", IEEE TRANSACTIONS ON VEHICULAR TECHNOLOGY, vol. 43, n. 3, August 1994, pp. 781-785;

evaluation of the square deviations of the envelope compressed according to a logarithmic law, as described in the work of J. M. Holtzman et al.: "Adaptive Averaging Methodology for Handoffs in Cellular Systems", IEEE TRANSACTIONS ON VEHICULAR TECHNOLOGY, vol. 44, n. 1, February 1995, pp. 59-66; and again application of the continuous wavelet transform, as described in the work of R. Narasimhan et al.: "Speed Estimation in Wireless Systems Using Wavelets" IEEE International Conference on Communications: Jun. 6-10, 1999, Vancouver, British Columbia, Canada, pages 1773-1778.

The zero-crossing method (ZCR) is usually applied to the envelope of the signal. Instead, in the documents US2002 167913 and WO-A-02/063814 already cited previously, the Doppler spread is estimated starting from the channel-gain estimation, using however an autocovariance-based method.

BRIEF SUMMARY OF THE INVENTION

In view of the above considerations, the field of possible example application of embodiments of the invention also extends to all the procedures that use estimation of the speed of the mobile terminal.

One purpose of an embodiment of the present invention is to further improve the techniques of estimation of Doppler spread described previously. This applies in particular as regards the need to handle conditions characterized by a high noise level, remaining however in the field of configurations of estimation that are, as a whole, simple and hence avoiding the intrinsic complexity linked, for example, to autocovariance-based techniques.

According to the present invention, the above purpose is achieved thanks to a method having the characteristics recalled specifically in the claims that follow. The invention relates also to a corresponding system, as well as a corresponding computer product that can be loaded into the memory of a computer, such as a programmable microprocessor, and containing portions of software code for implementing the method according to the invention when the product is run on a computer. Alternatively, this system can be implemented within dedicated integrated circuits. This system of an embodiment is generally adopted within mobile radio devices or mobile radio base stations.

The main advantages that may be achieved with the solution described herein are outlined in what follows.

It is possible to measure the Doppler spread with a computational burden considerably lower than that of other methods (for example, the methods based upon determination of autocovariance). In practice, an embodiment of the solution described herein is based upon the use of a counter, and the only burdensome operation, namely, the estimation of Doppler spread, is carried out at a very low rate, which reduces considerably the computational burden.

In the second place, an embodiment of the solution described herein enables the bias inherent in the estimation of Doppler spread due to noise to be completely eliminated. One embodiment of the solution described herein uses in fact an estimation of the signal-to-noise ratio which is at the same time simple and rather robust, since it is above all an estimation already conducted normally for other purposes.

An embodiment of the solution described herein is able to track rapid changes of speed thanks to recourse, in the currently preferred embodiment, to a control based upon a finite-state machine.

Finally, an embodiment of the solution described herein is in itself independent of the criterion adopted for channel estimation, so that it can readily be adapted to different solutions that may be applied to channel estimation.

BRIEF DESCRIPTION OF THE SEVERAL VIEWS OF THE DRAWINGS

One or more embodiments will now be described, purely by way of non-limiting examples, with reference to the attached drawings, in which.

DETAILED DESCRIPTION

Figure 1:
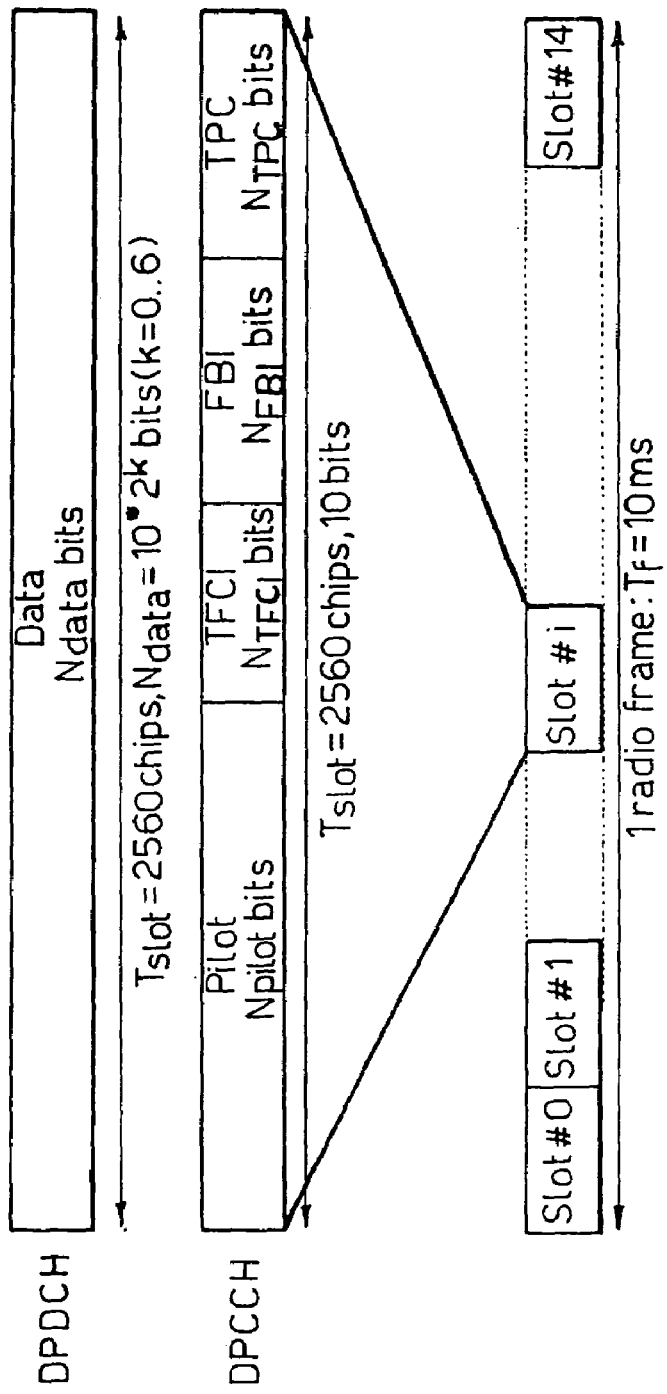
FIG. 1 illustrates the typical organization of a pilot signal in a CDMA-type transmission system.

Embodiments of a method and system for estimating the Doppler spread in radio mobile telecommunication systems and computer program product therefor are described herein. In the following description, numerous specific details are given to provide a thorough understanding of embodiments. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Described in what follows is one or more embodiments of a solution that enables adaptive control of channel estimation in a radio-communication system implemented with the aid of a pilot signal.

Channel estimation is controlled according to the Doppler spread, which is in turn estimated by means of a zero-crossing technique of a modified type. Specifically, in one embodiment of the solution described herein, control of Doppler-spread estimation and channel estimation is carried out using a finite-state machine.

One embodiment of the solution described herein presupposes the availability of a pilot signal made up of known symbols.

In particular, it will be assumed that the channel is affected by fading of a flat type. This choice is made, above all, for reasons of simplicity of illustration; embodiments of the solution described herein can also be used in conditions in which there is present a selectivity in frequency, in so far as the modulation technique adopted will enable operation in frequency diversity (for example, operating with spread-spectrum techniques with rake receivers, or with OFDM systems).

In addition, there will be assumed available, at least in an approximate way, the information on the shape of the power spectral density of the channel-gain process: the corresponding formulae (which are provided in what follows) are well known to the art.

In this connection, it should be recalled once again that channel estimation—understood as a specific methodology—does not form the subject of the present invention: in this regard, there are available different methods that may be applied to the context considered herein, in particular with the possibility of being adapted "on the fly" to the operating conditions.

By way of example, it is possible to envisage a moving average of the demodulated pilot signal, and channel estimation forms part of a so-called "finger" of a rake receiver for spread-spectrum communications. The length of the window used for the averaging operation is variable and can be controlled according to the estimation of the speed.

Just to give an idea, without this being intended as in any way limiting the scope of the invention, reference can be made to a rake receiver used in a UMTS mobile transmission system, operating according to the Frequency-Division-Duplex (FDD) criterion, in particular with reference to the up-link connection to the base station. For further details in this regard useful reference may be made to the specification 3GPP TS 25.211 V3.6.0 (2001-03), Technical Specification, 3rd GPP; Technical Specification; Physical channels and mapping of transport channels onto physical channels (FDD)—(Release 1999).

In this context (and referring, in this connection, to FIG. 1 of the attached drawings, which refers precisely to the specifications cited above) up-link transmission is made by transmitting successive radio frames. Each radio frame has a duration of 10 ms and is divided into 15 slots, each with a duration $T_{slot}=2560$ chips corresponding to one power-control period. Each chip has a duration of 260 ns. The data and control bits to be transmitted from the mobile terminal to the base station are mapped in uplink dedicated physical channels.

Specifically, the flow of information bits, referred to Dedicated Physical Data Channel (DPDCH) is transmitted simultaneously with the flow of control bits, referred to Dedicated Physical Control Channel (DPCCH).

Specifically, FIG. 1 illustrates the frame structure of each channel. It is to be noted that a certain number of the DPCCH bits constitutes fields of pilot bits known to the receiver, which are designed to be used for channel estimation.

Figure 2:
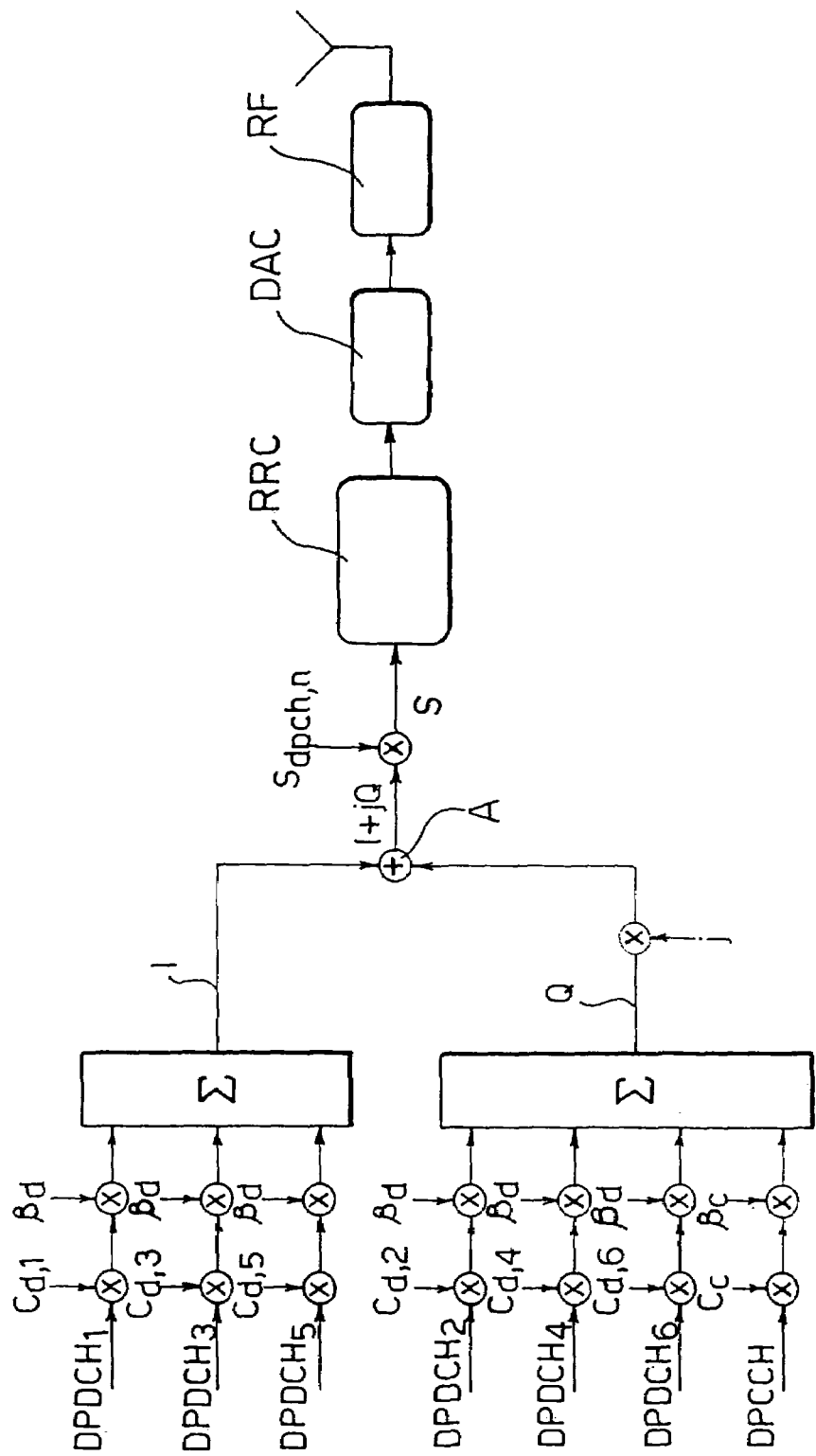
FIG. 2 is a functional block diagram of an embodiment of a transmission circuit that envisages the entry of pilot symbols for the estimation of Doppler spread.

The block diagram of FIG. 2 shows how the bits of the channels DPCCH and DPDCH are multiplied by a specific spreading code (Cc and Cd) to perform the function known as channeling. Up to six different DPDCH signals can be multiplexed with one another. After channeling, the signals which are subjected to spreading and present a real value are weighted with weighting factors, i.e., $\beta_c$ for the DPCCH signal and $\beta_d$ for all the DPDCH signals.

After weighting has been carried out, the flows of chips with real value on the in-phase (I) and quadrature (O) branches are added in an adder A and treated in a flow of chips with complex value (with an in-phase component for the DPDCH signal and a quadrature component for the DPCCH signal). Said complex signal is then subjected to scrambling with the code $S_{dpch,n}$, which is a code with complex value.

The scrambling code is applied in alignment with the radio frames, i.e., the first scrambling chip corresponds to the start of a radio frame.

Finally, the complex data, subjected to pulse shaping with a Root-Raised-Cosine (RRC) filter, for example with a roll-off value of 0.22, are converted into an analog form in a respective DAC converter and then passed to radio frequency in a corresponding RF module in view of radio transmission.

The signal propagates in air in a channel exposed to multipath phenomena, selective in frequency and time-variant.

At the base station, the signal is detected by one or more antennas, is supplied to the state of the analog front-end (AFE) that is associated to the receiving antenna or antennas (see FIG. 3), is converted into digital form in an analog-to-digital converter (ADC) and is passed through a stage of a digital front-end (DFE), where a function of pulse-shaping and, if necessary, of sub-sampling is performed.

The signal is then supplied to a rake receiver 10, is stored in a buffer memory 12, and is then supplied to the various fingers 14 comprised in the receiver 10.

The receiver 10 is configured in such a way as to detect any significant replica of the signal produced as a result of multipath fading. This occurs by means of a delay-profile estimator 15, which produces a corresponding memory address so as to read the replicas of the signal. Each replica of the detected signal is sent to a respective finger 14, where a fine adaptation of the sampling instant is made (modules designated by 16), and then proceeds to the descrambling and dispreading functions (modules 18).

The reference 18a indicates a code generator that co-operates—according to known criteria—with the blocks 12, 15, 16 and 18 just described.

The said operations supply, to the output of the descrambling and de-spreading modules, demodulated signals corresponding respectively to the DPDCH and DPCCH signals, of course taking into in account the fact that the signals in question are made up of symbols affected by the channel that is subject to fading. The symbols in question then undergo compensation of the channel distortion in respective channel-compensation modules designated by 20.

Operation of each block 20 is based upon a channel estimate and upon performing a complex multiplication of the symbols comprised in the DPCCH and DPDCH signals by the complex-conjugate of the complex number that represents channel estimation.

Finally, the signals at output from each finger 14 are combined in a module 22, which performs a Maximum-Ratio-Combining (MRC) function.

Those of skill in the art will appreciate that what has been described so far with reference to the general scheme of the receiver 10 corresponds to criteria in themselves widely known to the art and may be implemented according to a wide variety of different constructional solutions.

This applies in particular, but not exclusively, as regards creation of the combination module 22, which is able to operate according to various criteria (choices or combinations of various nature of different estimations according to the signal-to-noise ratio associated thereto, combination of estimations coming from pilot symbols transmitted continuously and/or discontinuously).

Figure 4:
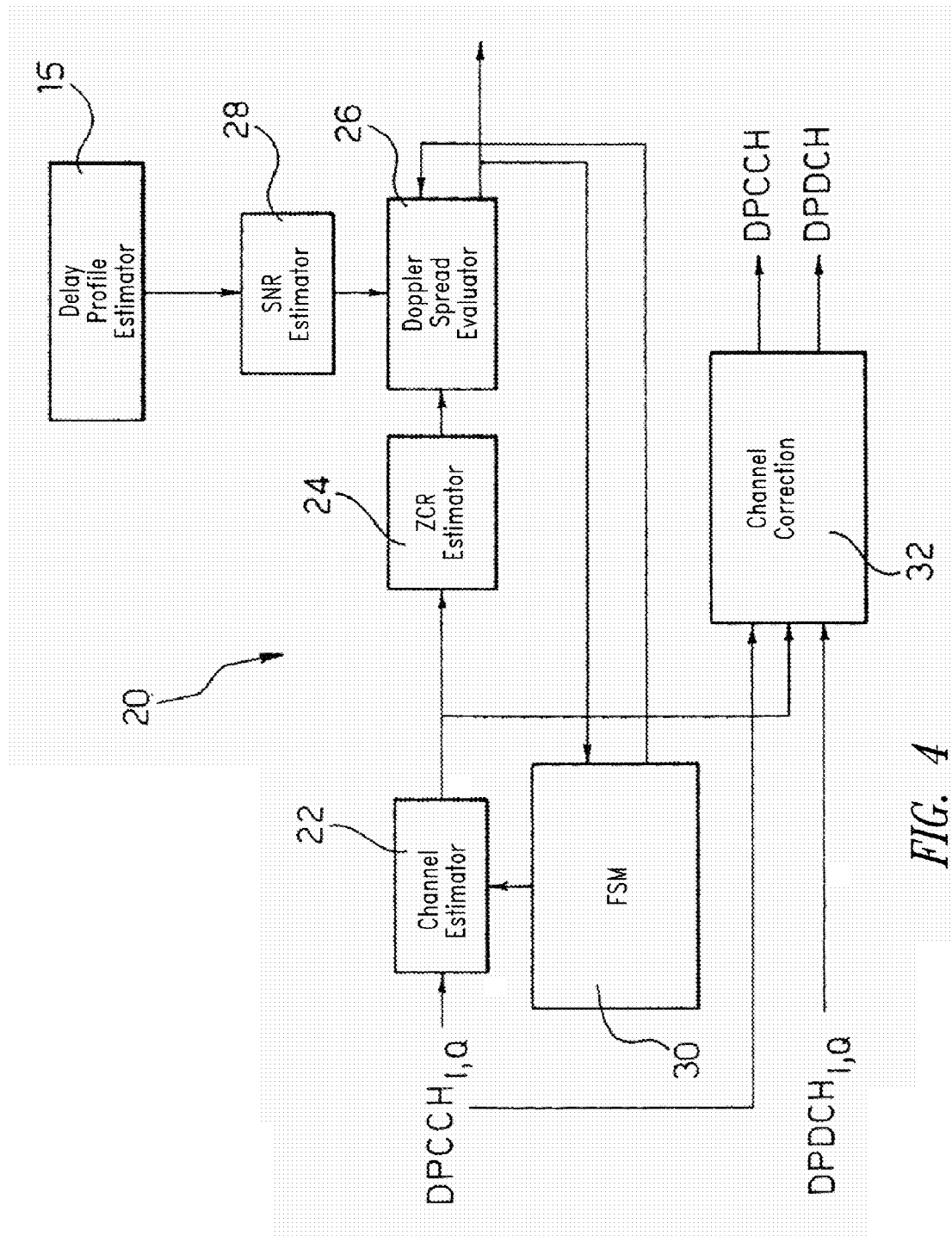
FIG. 4 integrates with greater detail the block diagram represented in FIG. 3 as regards channel estimation and Doppler-spread-estimation.

Each channel-compensation block 20 has typically the structure illustrated in FIG. 4 and is hence designed to operate on the signals $DPCCH_{I,Q}$ (with in-phase I and quadrature Q components) and $DPDCH_{I,Q}$ (also in this case, with in-phase I and quadrature Q components).

With reference to the scheme of transmitter represented in FIG. 2, the demodulated pilot symbols are comprised in the complex signal DPCCH. Each slot contains 10 DPCCH symbols, with each slot that contains a variable number of consecutive pilot symbols followed by other warning symbols, which in general are no longer used for the purposes of channel estimation.

The core of the channel-compensation module or unit 20 is constituted by a channel-estimation module 22 (FIG. 4), which, in the example illustrated herein, operates on the signal $DPCCH_{I,Q}$.

Those of skill in the art will readily understand that the channel-estimation block module 22 can be implemented in different ways. It is emphasized once again that the specific function of channel estimation implemented in the module 22 does not constitute, in itself, a direct subject of the present patent application. There exist in this connection numerous different techniques that may be adopted. In particular, recourse may be had to techniques that enable on-the-fly adaptation to the channel conditions, for example adapting the number of pilot symbols used for a given instantaneous channel estimation; the specific algorithms adopted for channel estimation starting from the pilot symbols are not in themselves determining factors. Analytical or numeric evaluation of the equivalent transfer function of the corresponding channel-estimation algorithm (block) is, however, performed.

The information on the transfer function is used by the Doppler-spread estimator as described in greater detail in what follows.

Just to give an idea (without this, however, being understood as in any way limiting the scope of the invention), the channel-estimation module 22 may be thought as operating by varying the number of pilot symbols used, employing pilot symbols belonging to one or more different slots. Again, the module 22 can comprise a moving-average function of the pilots belonging to one or more slots followed by a linear interpolation where no pilot fields are present.

Once the channel-gain estimation has been carried out, there are then performed again the estimation of the bandwidth of the channel random process and estimation of the speed. This is done in a series of additional blocks comprised in the module 20, which are described in greater detail in what follows.

In particular, a module designated by 24 performs the estimation of the zero-crossing rate (ZCR) of the channel gain.

Figure 3:
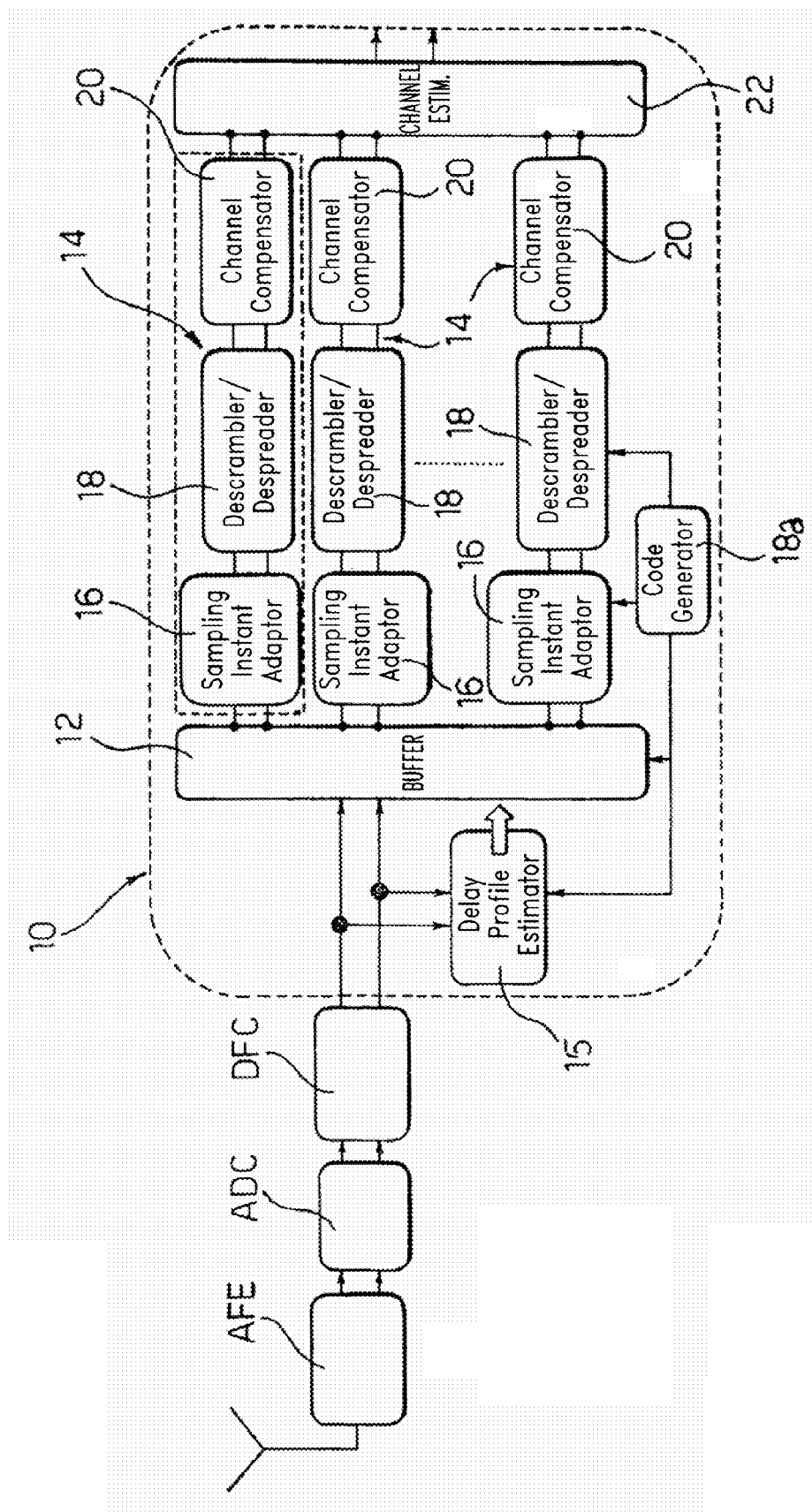
FIG. 3 is a block diagram of an embodiment of a corresponding receiver.

In yet a further module, designated by 26, there is performed the evaluation of the Doppler spread and of speed. This is done using various input parameters, namely:

the value of the signal-to-noise ratio (SNR) corresponding to the pilot symbols DPCCH supplied by a corresponding estimator 28 according to the estimation of the delay profile inferred from the module 15, which—for reasons of clarity of representation—has been reproduced both in FIG. 3 and in FIG. 4; this value can be obtained employing other methods known to persons skilled in the sector;

the zero-crossing rate, as estimated in the module 24; and the information corresponding to the strategy of channel estimation and, in particular, the information corresponding to the transfer function of the channel estimator (in general pre-calculated and stored in a memory) supplied by a module 30, preferably configured as a finite-state machine.

Finally, the reference number 32 in FIG. 4 designates a channel-correction module in which the channel gain (as a complex factor) estimated by the channel estimator 22 is used for correcting the DPCCH and DPDCH signals via a complex-conjugate multiplication function.

The speed information is used for the strategy of channel estimation implemented in the finite-state machine of the module 30.

In particular, the modules designated by 24 and 26 perform the Doppler-spread estimation function implemented and the speed-estimation function through an operation of detection of the zero-crossing rate that able to handle situations of very noisy operation, which would normally create serious problems in Doppler-spread estimation.

Specifically, in the example of embodiment illustrated herein, the module 24 measures the zero-crossing rate η of the in-phase and quadrature components of the channel gain estimated in unit time. The measurement window is determined according to the operating conditions. In particular, the measurement is made in a time interval during which the quantity subjected to evaluation is basically constant.

A simple criterion to fix the amplitude of this measurement includes considering the fact that, in ideal conditions (absence of noise), in order to have a reliable estimation of η there would typically be measured from 100 to 500 zero-crossing events. The average duration of the window $T_{average}$ can then be calculated with the approximate formula:

$$T_{average} = \frac{N_{ZC}}{\eta} \approx \frac{N_{ZC}}{f_D},$$

setting $N_{ZC}$ equal to 100-500 and choosing $f_D$ as the minimum expected value for the Doppler spread.

Usually a compromise is reached taking into account that, during the time window represented by $T_{average}$, the channel statistics must be as a whole constant.

The speed estimator 26 performs the estimation of the bandwidth $f_D$ of the channel-gain random process according to the following formulas:

$$\hat{f}_D = \sqrt{(3/4\pi^2)\hat{I}_D^{(2)}} \quad \text{for flat-type Doppler}$$

$$\hat{f}_D = \sqrt{(2/4\pi^2)\hat{I}_D^{(2)}} \quad \text{for classic Doppler}$$

where the definitions of flat Doppler spectrum and classic Doppler spectrum, according to the scattering environment in which the system operates, are ones that are well known to the prior art, as defined, for example, in the book by W. C. Jakes, Ed., Microwave Mobile Communication, New York, Wiley, 1974.

The quantity $\hat{I}_D^{(2)}$ is calculated according to the following formula:

$$\hat{I}_D^{(2)} = \hat{\eta}^2 \pi^2 - \frac{I_N^{(2)} - \hat{\eta}^2 \pi^2 I_N^{(0)}}{2SNR}$$

where $\hat{\eta}$ is an estimate of the zero-crossing rate and SNR is the signal-to-noise ratio provided by the estimator in said ratio, designated by 28.

The above formula may be derived on the basis of the relation between zero-crossing rate and power spectral density described in the well known reference volume by A. Papoulis: "Probability, Random Variables and Stochastic Processes", third edition, 1991, McGraw-Hill (Chapter 16, Section 1).

The second term in the equation cited above represents a correction factor that takes into account the contribution of noise to the number of zero-crossings. This is a significant aspect of the solution described herein.

The quantities $I_N^{(n)}$ are calculated according to the formula given below:

$$I_N^{(n)} = \int \omega^n |H(\omega)|^2 d\omega$$

where the integral is from $-\infty$ to $+\infty$ and $H(\omega)$ is the transfer function of the channel estimator 22 which is (reasonably) assumed to have a wider passband than the bandwidth of the channel process.

Given that $H(\omega)$ varies when the channel estimator 22 modifies the number of pilot symbols adopted for estimation, it is useful to store pre-calculated values of the quantity $I_N^{(n)}$ for each configuration of the channel estimator itself.

Finally the speed v is calculated applying the following formula:

$$v = f_D \lambda$$

where $\lambda$ is the wavelength of the transmission system given by:

$$\lambda = \frac{c}{f_0}$$

where c is the speed of the light and $f_0$ is the carrier frequency.

Estimation of Doppler spread and estimation of the speed are obtained with a period equal to the time window used for estimation of the zero-crossing rate.

As regards the module 28 for estimation of the signal-to-noise ratio, a typical implementation is based upon estimation of the signal-to-noise ratio of the pilot symbols prior to channel estimation. This information can be derived via estimation of the delay profile supplied by the module 16 comprised in the rake receiver 12. In any case, this is just one of the possible choices.

The signal-to-noise ratio SNR is defined in general as:

$$SNR = \sigma_D^2 / \sigma_N^2,$$

i.e., as a ratio between the variance $\sigma_D^2$ of the channel estimation and the variance $\sigma_N^2$ of the noise. The block or module for controlling channel estimation designated by 30 performs adaptation of the channel estimation on the basis of the estimated instantaneous speed.

In particular, the module 30 can carry out automatic regulation of the channel estimator on the basis of the last speed estimation.

Figure 5:
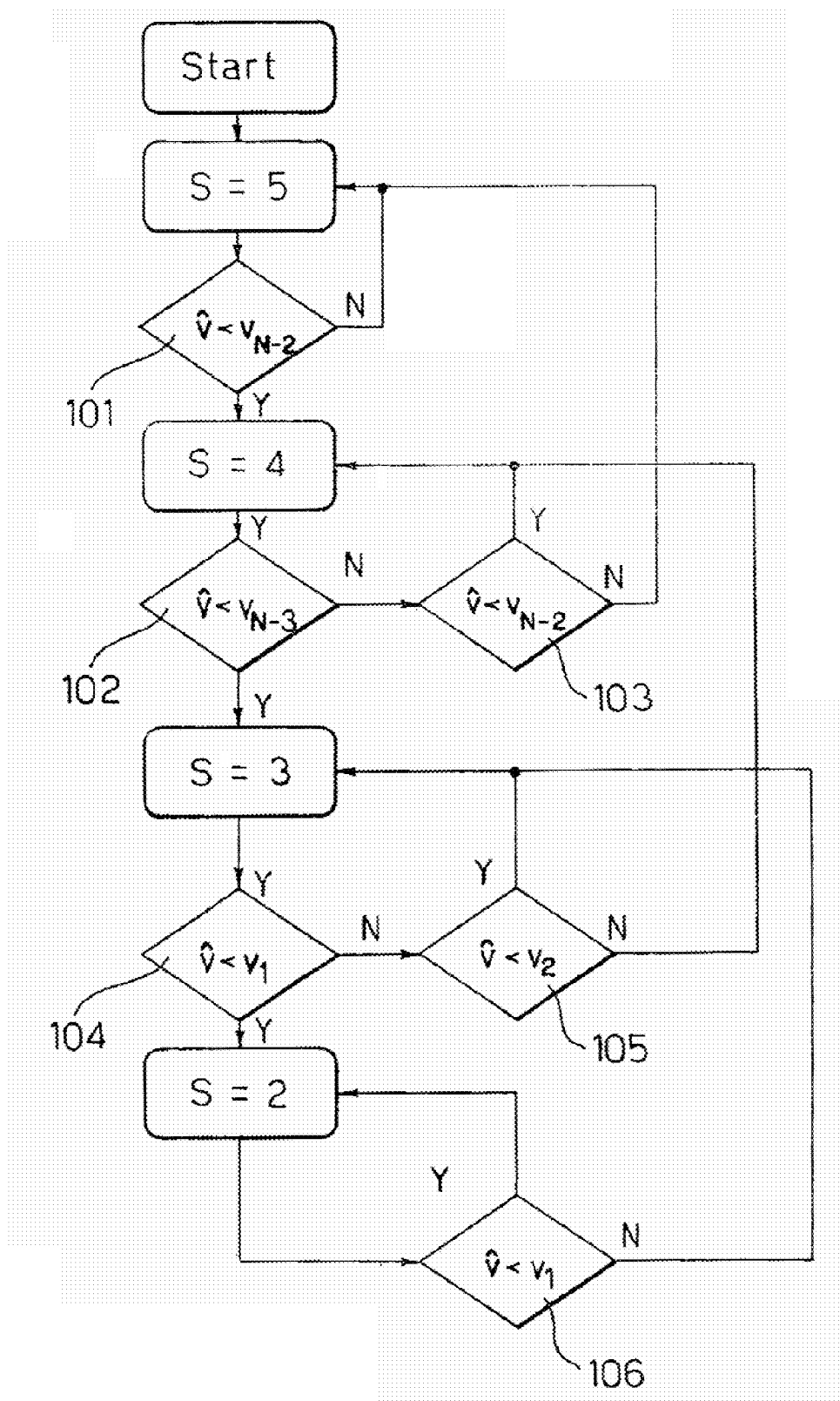
FIG. 5 is a flowchart which illustrates the criteria of implementation of an embodiment of the solution described herein.

In one embodiment, for the above purpose a finite-state state machine is used having a state flow of the type represented in FIG. 5.

In the diagram of FIG. 5, the states corresponds to the state of the current channel estimation (for instance, with reference to the example given previously, the number of pilot symbols used). The speed thresholds and the corresponding channel-estimation states are fixed using, for example, a table such as the one appearing below:

| STATE | THRESHOLD SPEED [km/h] | NUMBER OF PILOT SYMBOLS ADOPTED |
|---|---|---|
| N | $v_N$ | $Np_N$ |
| . | . | . |
| . | . | . |
| . | . | . |
| 2 | $v_2$ | $Np_2$ |
| 1 | $v_1$ | $Np_1$ |

The table is adapted to the conditions of operation of the system, with observance of the following conditions:
$v_N > v_{N-1}$ (i.e., thresholds arranged in ascending order)
$Np_N < Np_{N-1}$ Furthermore, the values $Np_N$ are the maximum ones compatible with the speed $v_N$.

With specific reference to the diagram of FIG. 5, the finite-state machine illustrated envisages five states corresponding to five different strategies of channel estimation that use five different combinations of pilot symbols.

The control machine is initially in the state the label of which has the highest number, i.e., corresponds to the highest speed threshold (the maximum expected speed), in order to prevents an undesirable distortion of the channel gain. The state is then gradually refined according to the measured speed. To prevent the undesirable jumps due to speed estimates affected by noise, there are allowed transitions only between contiguous states. To prevent equally undesirable channel-gain distortions, in steady-state conditions the speed thresholds are used in such a way as to maintain the number of pilot symbols used lower than the maximum tolerable value for a certain speed threshold. In this way small errors in speed estimation do not influence the channel-gain estimator.

In the diagram of FIG. 5, the choice blocks designated by the references 101 to 106 indicate the operations of comparison with the various thresholds arranged in ascending order according to the index N, whilst the various states are designated by S=2, S=3, S=4 and S=5. Clearly, the symbols Y and N indicate the positive outcome and the negative outcome, respectively, of the individual comparison operation.

The channel-compensation function implemented in module 32 performs, as has already been said, the multiplication of the signals DPCCH (with the exclusion of the pilot fields) and DPDCH, and more specifically, multiplication of the respective symbols by the complex-conjugated value of channel gain so as to produce the demodulated signals at output from the module 32.

Finally, those of skill in the art will appreciate the fact that, without prejudice to the basic solution of estimation of the bandwidth of the random process that represents the channel as a function of a reference quantity which comprises a first term-representing an estimation of the zero-crossing rate and a second term that includes said signal-to-noise ratio (SNR) of the channel, the specific analytical formulations presented previously merely constitute preferred examples of embodiment of the invention, such as not to limit the scope thereof; definition of basically equivalent formulae is in fact a task within the reach of any person skilled in the art.

Consequently, without prejudice to the principle of the invention, the details of construction and the embodiments may vary even extensively with respect to what is described and illustrated herein purely by way of non-limiting example, without thereby departing from the scope of the present invention, as defined by the annexed claims.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

What is claimed is:

1. A method, comprising:
   evaluating a Doppler spread associated with a transmission channel with a gain represented by a random process, the evaluating including:
   transmitting, using a transmitter, on said channel a pilot signal having known fields of symbols;
   receiving, using a receiver, said pilot signal from said channel;
   estimating, based on said pilot signal, said channel so as to generate a gain signal indicating said gain;
   detecting a zero-crossing rate of said gain signal during a given time interval;
   estimating a signal-to-noise ratio associated with said channel in a manner that eliminates bias due to noise inherent in estimation of said Doppler spread; and
   estimating a bandwidth of said random process as a function of a reference quantity having:
      a first term representing an estimate of said zero-crossing rate; and
      a second term that includes said signal-to-noise ratio of the channel, wherein said bandwidth $\hat{f}_D$ of said random process is estimated according to one of the following relations:

$$\hat{f}_D = \sqrt{(3/4\pi^2)\hat{I}_D^{(2)}}$$
$$\hat{f}_D = \sqrt{(2/4\pi^2)\hat{I}_D^{(2)}}$$

wherein $\hat{I}_D^{(2)}$ is said reference quantity and $\hat{f}_D$ is said bandwidth.

2. The method according to claim 1, further comprising:
   generating said gain signal as a signal with in-phase and quadrature components; wherein the detecting includes detecting, during said given time interval, the zero-crossing rate of the in-phase and quadrature components of said gain signal.

3. A method comprising:
   evaluating a Doppler spread associated to a transmission channel with a gain represented by a random process, the evaluating including:
   transmitting, using a transmitter, on said channel a pilot signal having known fields of symbols;
   receiving, using a receiver, said pilot signal from said channel;
   estimating, based on said pilot signal, said channel so as to generate a gain signal indicating said gain;
   detecting a zero-crossing rate of said gain signal during a given time interval;
   estimating a signal-to-noise ratio associated with said channel in a manner that eliminates bias due to noise inherent in estimation of said Doppler spread; and
   estimating a bandwidth of said random process as a function of a reference quantity having:
      a first term representing an estimate of said zero-crossing rate; and
      a second term that includes said signal-to-noise ratio of the channel, wherein said second term corresponds to a relation of a type:

$$\frac{I_N^{(2)} - \hat{\eta}^2 \pi^2 I_N^{(0)}}{2SNR}$$

wherein $\hat{\eta}$ represents an expected value of said zero-crossing rate, SNR is said signal-to-noise ratio, and the quantities $I_N^{(n)}$ are calculated according to a relation:

$I_N^{(n)} = \int \omega^n |H(\omega)|^2 d\omega$ wherein the integral is from $-\infty$ to $+\infty$ and $H(\omega)$ is a transfer function of a channel estimator.

4. A method comprising:
   evaluating a Doppler spread associated to a transmission channel with a gain represented by a random process, the evaluating including:
   transmitting, using a transmitter, on said channel a pilot signal having known fields of symbols;
   receiving, using a receiver, said pilot signal from said channel;
   estimating, based on said pilot signal, said channel so as to generate a gain signal indicating said gain;
   detecting a zero-crossing rate of said gain signal during a given time interval;
   estimating a signal-to-noise ratio associated with said channel in a manner that eliminates bias due to noise inherent in estimation of said Doppler spread; and
   estimating a bandwidth of said random process as a function of a reference quantity having:
      a first term representing an estimate of said zero-crossing rate; and
      a second term that includes said signal-to-noise ratio of the channel, wherein said transmission channel includes a radio transmission channel between a transmitter and a receiver in relative movement with respect to one another at a given speed
   estimating said given speed as a function of said Doppler spread;
   defining at least one threshold value for said given speed;
   comparing said estimation of said given speed as said function of said Doppler spread with said at least one threshold value; and
   adopting different strategies for operation of channel estimation according to an outcome of said comparing.

5. The method according to claim 4 wherein said given speed is estimated on a basis of a relation:

$v = \hat{f}_D \lambda$ wherein $v$ is said estimated given speed, $\hat{f}_D$ is said estimated bandwidth of said random process, and $\lambda$ is a wavelength used for transmission on said channel.

6. The method according to claim 4, further comprising adopting various strategies for estimating said channel according to a value assumed by said given speed.

7. The method according to claim 4, further comprising implementing said at least one threshold value and said comparing using a finite-state machine.

8. The method according to claim 6 wherein said strategies adopted for estimating said channel involve use of a different number of pilot symbols.

9. The method of claim 1, further comprising:
   producing the pilot signal as a digital pilot signal;
   converting the digital pilot signal to an analog pilot signal, wherein transmitting the pilot signal includes transmitting the analog pilot signal and receiving the pilot signal includes receiving the analog pilot signal; and converting the received analog pilot signal into digital form.

10. The method of claim 3, further comprising:
producing the pilot signal as a digital pilot signal;
converting the digital pilot signal to an analog pilot signal, wherein transmitting the pilot signal includes transmitting the analog pilot signal and receiving the pilot signal includes receiving the analog pilot signal; and
converting the received analog pilot signal into digital form.

11. The method of claim 4, further comprising:
producing the pilot signal as a digital pilot signal;
converting the digital pilot signal to an analog pilot signal, wherein transmitting the pilot signal includes transmitting the analog pilot signal and receiving the pilot signal includes receiving the analog pilot signal; and
converting the received analog pilot signal into digital form.

12. A method, comprising:
evaluating a Doppler spread associated with a transmission channel with a gain represented by a random process, the evaluating including:
transmitting, using a transmitter, on said channel a pilot signal having known fields of symbols;
receiving, using a receiver, said pilot signal from said channel;
estimating, based on said pilot signal, said channel so as to generate a signal indicating said gain;
detecting a zero-crossing rate of said gain signal during a given time interval;
estimating a signal-to-noise ratio associated with said channel; and
estimating a bandwidth of said random process as a function of a reference quantity having:
a first term that represents an estimate of said zero-crossing rate; and
a second term that includes said signal-to-noise ratio of the channel, wherein said first term represents said estimate of said zero-crossing rate by being proportional to a square of the estimate of said zero-crossing rate.

13. The method according to claim 12 wherein said first term and said second term are of opposite sign.

14. The method according to claim 12 wherein said signal-to-noise ratio is estimated as a ratio between a variance of an estimation of said channel and a variance of an associated noise.

15. The method of claim 12, further comprising:
producing the pilot signal as a digital pilot signal;
converting the digital pilot signal to an analog pilot signal, wherein transmitting the pilot signal includes transmitting the analog pilot signal and receiving the pilot signal includes receiving the analog pilot signal; and
converting the received analog pilot signal into digital form.

16. A method, comprising:
evaluating a Doppler spread associated with a transmission channel with a gain represented by a random process, the evaluating including:
transmitting, using a transmitter, on said channel a pilot signal having known fields of symbols;
receiving, using a receiver, said pilot signal from said channel;
estimating, based on said pilot signal, said channel so as to generate a gain signal indicating said gain;
detecting a zero-crossing rate of said gain signal during a given time interval;
estimating a signal-to-noise ratio associated with said channel; and
estimating a bandwidth of said random process as a function of a reference quantity having:
a first term representing an estimate of said zero-crossing rate; and
a second term that includes said signal-to-noise ratio of the channel, wherein said signal-to-noise ratio appears in a denominator of said second term.

17. The method according to claim 16, further comprising determining said given time interval as a ratio between an expected value of said zero-crossing rate and a minimum expected value of said bandwidth of said random process.

18. The method according to claim 16 wherein estimating said channel is made according to different estimation laws according to a result of said evaluation of the Doppler spread.

19. The method of claim 16, further comprising:
producing the pilot signal as a digital pilot signal;
converting the digital pilot signal to an analog pilot signal, wherein transmitting the pilot signal includes transmitting the analog pilot signal and receiving the pilot signal includes receiving the analog pilot signal; and
converting the received analog pilot signal into digital form.

20. A system to evaluate a Doppler spread associated with a transmission channel with a gain represented by a random process, the system comprising:
a receiver configured to receive, from said channel, a pilot signal, which in turn has fields of known symbols, said receiver including:
a channel estimator that is configured to carry out estimation of said channel, based on said pilot signal, so as to generate a gain signal indicating said gain;
a zero-crossing detection module, which is configured to detect a zero-crossing rate of said gain signal during a given time interval;
a noise estimator, which is configured to estimate a signal-to-noise ratio associated with said channel; and
at least one estimation module coupled to the zero-crossing detection module and to the noise estimator and being configured for estimation of a bandwidth of said random process as a function of a reference quantity that includes:
a first term that represents an estimate of said zero-crossing rate; and
a second term that includes said signal-to-noise ratio associated with the channel,
wherein said first term represents said estimate of said zero-crossing rate by being proportional to a square of the estimate of said zero-crossing rate.

21. The system according to claim 20 wherein:
said channel estimator is configured to generate said gain signal as a signal with in-phase and quadrature components; and
said zero-crossing detection module is configured to detect, during said given time interval, the zero-crossing rate of the in-phase and quadrature components of said gain signal.

22. The system according to claim 20 wherein said zero-crossing detection module is configured to determine said given time interval as a ratio between an expected value of said zero-crossing rate and a minimum expected value of said bandwidth of said random process.

23. The system according to claim 20 wherein said estimation module is configured for estimation of said bandwidth of said random process according to one of the following relations:

$$\hat{f}_D = \sqrt{(3/4\pi^2)\hat{I}_D^{(2)}}$$
$$\hat{f}_D = \sqrt{(2/4\pi^2)\hat{I}_D^{(2)}}$$

wherein $\hat{I}_D^{(2)}$ is said reference quantity and $\hat{f}_D$ is said bandwidth.

24. The system according to claim 20 wherein said second term corresponds to a relation of a type:

$$\frac{I_N^{(2)} - \hat{\eta}^2 \pi^2 I_N^{(0)}}{2SNR}$$

wherein $\hat{\eta}$ represents the estimate of said zero-crossing rate, SNR is said signal-to-noise ratio, and quantities $I_N^{(n)}$ are calculated according to a relation:

$$I_N^{(n)} = \int \omega^n |H(\omega)|^2 d\omega$$

wherein the integral is from $-\infty$ to $+\infty$ and H ($\omega$) is a transfer function of said channel.

25. The system according to claim 20 wherein said receiver is configured to receive said pilot signal, from a transmitter via said transmission channel, the transmitter and the receiver being in relative movement with respect to one another at a given speed, and wherein said estimation module is configured to estimate said given speed as a function of said Doppler spread.

26. The system according to claim 25 wherein said estimation module is configured to estimate said given speed according to a relation:

$$v = \hat{f}_D \lambda$$

wherein v is said estimated given speed, $\hat{f}_D$ is said estimated bandwidth of said random process, and $\lambda$ is a wavelength used for transmission on said channel.

27. The system according to claim 20 wherein said channel estimator is configured for estimation of said channel according to different estimation laws according to a result of said evaluation of the Doppler spread.

28. The system according to claim 25 wherein said channel estimator is configured to adopt different strategies for estimation of said channel according to a value assumed by said given speed.

29. The system according to claim 25 wherein said channel estimator is configured to:
define at least one threshold value for said given speed;
compare said estimate of said given speed as said function of said Doppler spread with said at least one threshold value; and
adopt different strategies for said channel estimation according to an outcome of said compare.

30. The system according to claim 29 wherein a finite-state machine is configured to implement said at least one threshold value and said compare.

31. The system according to claim 28 wherein said channel estimator is configured to use a different number of pilot symbols to implement said strategies for estimation of said channel.

32. A system to evaluate a Doppler spread associated to a transmission channel with a gain represented by a random process, comprising a receiver configured to receive, from said channel, a pilot signal, which in turn has fields of known symbols, said receiver including:

a channel estimator configured to carry out estimation of said channel based on said pilot signal so as to generate a gain signal indicating said gain;
a zero-crossing detection module configured to detect a zero-crossing rate of said gain signal during a given time interval;
a noise estimator adapted to estimate a signal-to-noise ratio associated with said channel; and
at least one estimation module coupled to the zero-crossing detection module and to the noise estimator and being configured for estimation of a bandwidth of said random process as a function of a reference quantity that includes:
a first term representing an estimate of said zero-crossing rate; and
a second term that includes said signal-to-noise ratio associated with the channel, wherein said signal-to-noise ratio estimated by said noise estimator appears in a denominator of said second term.

33. The system according to claim 32 wherein said first term and said second term are of opposite sign.

34. The system according to claim 32 wherein said noise estimator is configured for estimation of said signal-to-noise ratio as a ratio between a variance of an estimation of said channel and a variance of an associated noise.

35. A computer-readable medium having code for causing a computing device to implement a method, comprising:
evaluating a Doppler spread associated with a transmission channel with a gain represented by a random process, the evaluating including:
receiving, using a receiver, from said channel a pilot signal having known fields of symbols;
estimating, on a basis of said pilot signal, said channel so as to generate a gain signal indicating said gain;
detecting a zero-crossing rate of said gain signal during a given time interval;
estimating a signal-to-noise ratio associated to said channel; and
estimating a bandwidth of said random process as a function of a reference quantity, the reference quantity having:
a first term that represents an estimate of said zero-crossing rate; and
a second term that includes said signal-to-noise ratio of the channel, wherein said first term represents said estimate of said zero-crossing rate by being proportional to a square of the estimate of said zero-crossing rate.

36. The computer-readable medium of claim 35, wherein the method includes:
generating said gain signal as a signal with in-phase and quadrature components; and
detecting, during said given time interval, the zero-crossing rate of the in-phase and quadrature components of said signal.

37. The computer-readable medium of claim 35, wherein the method includes determining said given time interval as a ratio between an expected value of said zero-crossing rate and a minimum expected value of said bandwidth of said random process.

38. The computer-readable medium of claim 35, wherein said transmission channel is a transmission channel between a transmitter and the receiver in relative movement with respect to one another at a given speed, wherein the method further includes estimating said given speed as a function of said Doppler spread.

39. The computer-readable medium of claim 38, wherein the method further includes adopting various strategies for estimating said channel according to a value assumed by said given speed.

40. The computer-readable medium of claim 38, wherein the method further includes:
defining at least one threshold value for said given speed;
comparing the estimate of said given speed as said function of said Doppler spread with said at least one threshold value; and
adopting different strategies for channel estimation according to an outcome of said comparing.

41. The computer-readable medium of claim 40 wherein the comparing includes using a finite-state machine.

42. The computer-readable medium of claim 39 wherein said strategies adopted for estimating said channel involve use of a different number of pilot symbols.

43. The computer-readable medium of claim 35 wherein:
estimating the signal-to-noise ratio includes estimating a ratio between a variance of the estimation of said channel and a variance of an associated noise;
and wherein:
estimating said channel is made according to different estimation laws according to a result of said evaluation of the Doppler spread.

44. A system for evaluating a Doppler spread associated with a transmission channel with a gain represented by a random process, wherein a pilot signal with fields of symbols can be transmitted on the channel, the system comprising:
means for estimating, based on the pilot signal, the channel so as to generate a gain signal indicating the gain;
means for detecting a zero-crossing rate of the gain signal during a given time interval; and
means for estimating a signal-to-noise ratio associated with the channel, and for estimating a bandwidth of the random process as a function of a reference quantity, the reference quantity having:
a first term that represents an estimate of the zero-crossing rate; and
a second term that includes the signal-to-noise ratio of the channel, wherein said first term represents said estimate of the zero-crossing rate by being proportional to a square of the estimate of said zero-crossing rate.

45. The system of claim 44 wherein:
said means for estimating the channel generates said gain signal as a signal with in-phase and quadrature components; and
said means for detecting said zero-crossing rate detects, during said given time interval, the zero-crossing rate of the in-phase and quadrature components of said gain signal.

46. The system of claim 44 wherein said means for detecting said zero-crossing rate determines the given time interval as a ratio between an expected value of the zero-crossing rate and a minimum expected value of the bandwidth of the random process.

47. The system of claim 44, wherein the channel is a radio transmission channel between a transmitter and a receiver in relative movement with respect to one another at a given speed, the system further comprising:
means for estimating said given speed as a function of said Doppler spread;
means for adopting various strategies for estimation of said channel according to a value assumed by said given speed;
means for defining at least one threshold value for said given speed;
means for comparing said estimated given speed as said function of said Doppler spread with said at least one threshold value; and
means for adopting different strategies for channel estimation according to an outcome of said comparing.

* * * * *